United States Patent
Bian et al.

(10) Patent No.: US 11,105,978 B2
(45) Date of Patent: Aug. 31, 2021

(54) POLARIZERS INCLUDING STACKED ELEMENTS

(71) Applicant: GLOBALFOUNDRIES U.S. Inc., Santa Clara, CA (US)

(72) Inventors: Yusheng Bian, Ballston Lake, NY (US); Ajey Poovannummoottil Jacob, Watervliet, NY (US)

(73) Assignee: GLOBALFOUNDRIES U.S. INC., Santa Clara, CA (US)

( * ) Notice: Subject to any disclaimer, the term of this patent is extended or adjusted under 35 U.S.C. 154(b) by 0 days.

(21) Appl. No.: 16/781,324

(22) Filed: Feb. 4, 2020

(65) Prior Publication Data
US 2021/0239903 A1 Aug. 5, 2021

(51) Int. Cl.
| | |
|---|---|
| *G02B 6/12* | (2006.01) |
| *G02B 6/126* | (2006.01) |
| *G02B 6/13* | (2006.01) |
| *G02B 6/125* | (2006.01) |
| *G02B 6/122* | (2006.01) |
| *G02B 6/10* | (2006.01) |

(52) U.S. Cl.
CPC .............. *G02B 6/126* (2013.01); *G02B 6/107* (2013.01); *G02B 6/125* (2013.01); *G02B 6/1228* (2013.01); *G02B 6/13* (2013.01)

(58) Field of Classification Search
CPC .......... G02B 6/126; G02B 6/107; G02B 6/13; G02B 6/125; G02B 6/1228
USPC .......................................... 385/11, 14, 30, 42
See application file for complete search history.

(56) References Cited

U.S. PATENT DOCUMENTS

| | | | | |
|---|---|---|---|---|
| 4,772,084 A | * | 9/1988 | Bogert | G02B 6/2804 385/40 |
| 4,911,513 A | * | 3/1990 | Valette | G02B 6/126 385/11 |
| 4,998,793 A | * | 3/1991 | Henry | G02B 6/126 385/1 |
| 5,946,434 A | * | 8/1999 | Lee | G02F 1/3132 385/45 |
| 5,963,315 A | | 10/1999 | Hiatt et al. | |

(Continued)

FOREIGN PATENT DOCUMENTS

EP 0535523 A1 * 4/1993 .............. G02B 6/12

OTHER PUBLICATIONS

Bian et al., "Non-Planar Waveguide Structures", filed Jul. 10, 2019 as U.S. Appl. No. 16/507,642.

(Continued)

*Primary Examiner* — Robert Tavlykaev
(74) *Attorney, Agent, or Firm* — Thompson Hine LLP; Anthony Canale

(57) ABSTRACT

Structures for a polarizer and methods of fabricating a structure for a polarizer. A first waveguide core has a first tapered section, a second tapered section, and a section positioned along a longitudinal axis between the first tapered section and the second tapered section. The first tapered section and the second tapered section each narrow in a direction along the longitudinal axis toward the section. A second waveguide core has a first terminating end, a second terminating end, and a section that is arranged between the first and second terminating ends. The section of the second waveguide core is positioned either over or below the section of the first waveguide core.

20 Claims, 16 Drawing Sheets

(56) References Cited

U.S. PATENT DOCUMENTS

| | | | |
|---|---|---|---|
| 7,949,212 B2* | 5/2011 | Gomyo | G02B 6/125 385/28 |
| 9,470,844 B1 | 10/2016 | Ma et al. | |
| 10,429,581 B1 | 10/2019 | Thomas et al. | |
| 10,429,582 B1 | 10/2019 | Bian et al. | |
| 10,436,982 B1 | 10/2019 | Bian et al. | |
| 2013/0343695 A1* | 12/2013 | Ben Bakir | G02B 6/126 385/11 |
| 2015/0277042 A1* | 10/2015 | Goodwill | G02B 6/126 385/11 |
| 2017/0192171 A1* | 7/2017 | Shi | G02B 6/126 |
| 2020/0026000 A1 | 1/2020 | Bian et al. | |

OTHER PUBLICATIONS

Bian et al., "Transverse-electric (TE) Pass Polarizer" filed Jul. 3, 2019 as U.S. Appl. No. 16/502,667.

Dai et al., "Compact broadband polarizer based on shallowly-etched silicon-on-insulator ridge optical waveguides", Optics Express vol. 18, Issue 26, pp. 27404-27415 (2010).

Sun et al., "Experimental demonstration of a hybrid plasmonic transverse electric pass polarizer for a silicon-on-insulator platform", Optics Letters vol. 37, Issue 23, pp. 4814-4816 (2012).

Huang et al., "CMOS compatible horizontal nanoplasmonic slot waveguides TE-pass polarizer on silicon-on-insulator platform", Optics Express vol. 21, Issue 10, pp. 12790-12796 (2013).

De Oliveira, et al., "Graphene Based Waveguide Polarizers: In-Depth Physical Analysis and Relevant Parameters", Sci Rep 5, 16949 (2015).

Bian et al., "Hybrid vanadate waveguiding configurations for extreme optical confinement and efficient polarization management in the 'near-infrared'", Nanoscale, 2018, 10, 16667.

Bian et al., "Polarizers and Polarization Splitters Phase-Matched With a Back-End-of-Line Layer", filed Mar. 4, 2019 as U.S. Appl. No. 16/291,346.

Chen et al., "Compact and integrated TM-pass waveguide polarizer", Optics Express vol. 13, Issue 14, pp. 5347-5352 (2005).

Q. Wang and S. Ho, "Ultracompact TM-Pass Silicon Nanophotonic Waveguide Polarizer and Design," in IEEE Photonics Journal, vol. 2, No. 1, pp. 49-56, Feb. 2010.

Ng et al., "Integrated Cu-based TM-pass polarizer using CMOS technology platform," 2010 Photonics Global Conference, Singapore, 2010, pp. 1-3.

Sang-Shin Lee et al., "TM-pass polarizer based on a photobleaching-induced waveguide in polymers," in IEEE Photonics Technology Letters, vol. 10, No. 6, pp. 836-838, Jun. 1998.

Saber et al., "CMOS compatible all-silicon TM pass polarizer based on highly doped silicon waveguide", Optics Express vol. 26, Issue 16, pp. 20878-20887 (2018).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.

M. L. Davenport and J. E. Bowers, "Efficient and broad band coupling between silicon and ultra-low-loss silicon nitride waveguides," 2016 IEEE Photonics Conference (IPC), Waikoloa, HI, 2016, pp. 631-632.

Chen et al., "Broadband Silicon-On-Insulator directional couplers using a combination of straight and curved waveguide sections", Scientific Reports vol. 7, Article No. 7246 (2017).

Sethi et al., "Compact broadband low-loss taper for coupling to a silicon nitride photonic wire", Optics Letters vol. 43, Issue 14, pp. 3433-3436 (2018).

\* cited by examiner

US 11,105,978 B2

POLARIZERS INCLUDING STACKED ELEMENTS

BACKGROUND

The present invention relates to photonics chips and, more specifically, to structures for a polarizer and methods of fabricating a structure for a polarizer.

Photonics chips are used in many applications and systems including, but not limited to, data communication systems and data computation systems. A photonics chip integrates optical components, such as waveguides, optical switches, and bends, and electronic components, such as field-effect transistors, into a unified platform. Among other factors, layout area, cost, and operational overhead may be reduced by the integration of both types of components.

Polarizers are a type of optical component commonly found in photonics chips. A polarizer is configured to receive an optical signal containing multiple modes (e.g., transverse electric (TE) mode and transverse magnetic (TM) mode) and to allow only one of these modes to propagate while the other of the modes is eliminated or dropped. Polarizers that pass the TM mode have rather large footprints that consume significant layout area on the photonics chip.

Improved structures for a polarizer and methods of fabricating a structure for a polarizer are needed.

SUMMARY

In an embodiment of the invention, a structure for a polarizer is provided. The structure includes a first waveguide core having a first tapered section, a second tapered section, and a section that is positioned along a longitudinal axis between the first tapered section and the second tapered section. The first tapered section and the second tapered section each narrow in a direction along the longitudinal axis toward the section. The structure further includes a second waveguide core having a first terminating end, a second terminating end, and a section that is arranged between the first terminating end and the second terminating end. The section of the second waveguide core is positioned either over or under the section of the first waveguide core.

In an embodiment of the invention, a structure for a polarizing coupler is provided. The structure includes a first waveguide core having a first straight section, a first tapered section, and a first curved section between the first tapered section and the first straight section. The first tapered section of the first waveguide core has a first terminating end. The structure further includes a second waveguide core having a second straight section, a second tapered section, and a second curved section between the second tapered section and the second straight section. The second tapered section of the first waveguide core has a second terminating end. The second curved section and the second tapered section of the second waveguide core are positioned over the first tapered section and the first curved section of the first waveguide core.

In an embodiment of the invention, a method of forming a structure for a polarizer is provided. The method includes forming a first waveguide core having a first tapered section, a second tapered section, and a section positioned along a longitudinal axis between the first tapered section and the second tapered section, and the first tapered section and the second tapered section each narrow in a direction along the longitudinal axis toward the section. The method further includes forming a second waveguide core including a first terminating end, a second terminating end, and a section that is arranged between the first terminating end and the second terminating end. The section of the second waveguide core is positioned either over or under the section of the first waveguide core.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
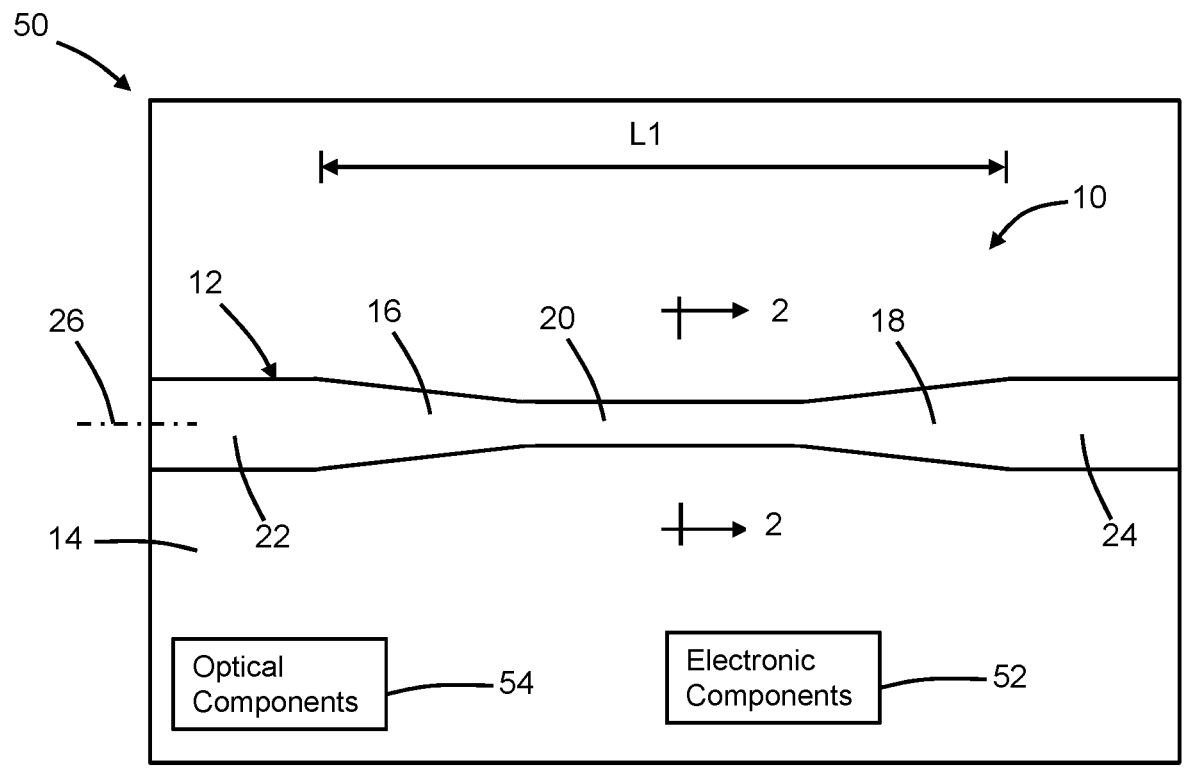
FIG. 1 is a top view of a structure at an initial fabrication stage of a processing method in accordance with embodiments of the invention.
Figure 2:
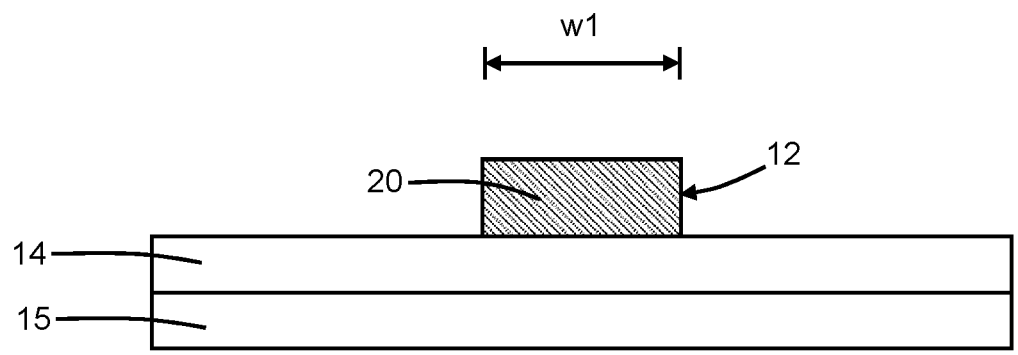
FIG. 2 is a cross-sectional view taken generally along line 2-2 in FIG. 1.

With reference to FIGS. 1, 2 and in accordance with embodiments of the invention, a structure 10 for a polarizer includes a waveguide core 12 that is positioned over a dielectric layer 14. The waveguide core 12 may be composed of a single-crystal semiconductor material, such as single-crystal silicon from a device layer of a silicon-on-insulator (SOI) wafer. The silicon-on-insulator wafer further includes a buried insulator layer composed of a dielectric material, such as silicon dioxide, that provides the dielectric layer 14 and a substrate 15 composed of a single-crystal semiconductor material, such as single-crystal silicon, under the buried insulator layer. The waveguide core 12 may be patterned from the device layer of the silicon-on-insulator wafer by lithography and etching processes during front-end-of-line processing. The device layer of the silicon-on-insulator wafer may be fully etched to define a rib waveguide as shown or, alternatively, only partially etched to define a ridge waveguide.

The waveguide core 12 includes a tapered section 16, a tapered section 18, and a section 20 that collectively join a section 22 to a section 24. Each of the sections 22, 24 has a greater width than the section 20. The section 20, which may be non-tapered or straight, is arranged between the tapered section 16 and the tapered section 18 along a longitudinal axis 26 of the waveguide core 12. In an embodiment, the section 20 may be centrally-located between tapered sections 16, 18 and the tapered sections 16, 18 may have equal dimensions. The tapered sections 16, 18 and section 20 may have a total length, L1, measured from an interface at the intersection of the tapered section 16 and section 22 to another interface at the intersection of the tapered section 18 and section 24, and a thickness that may be constant over the total length. The tapered sections 16, 18 each narrow in width in a direction along the longitudinal axis 26 toward the section 20. The section 20 of the waveguide core 12 may have a width, w1, that is constant over its length.

Figure 3:
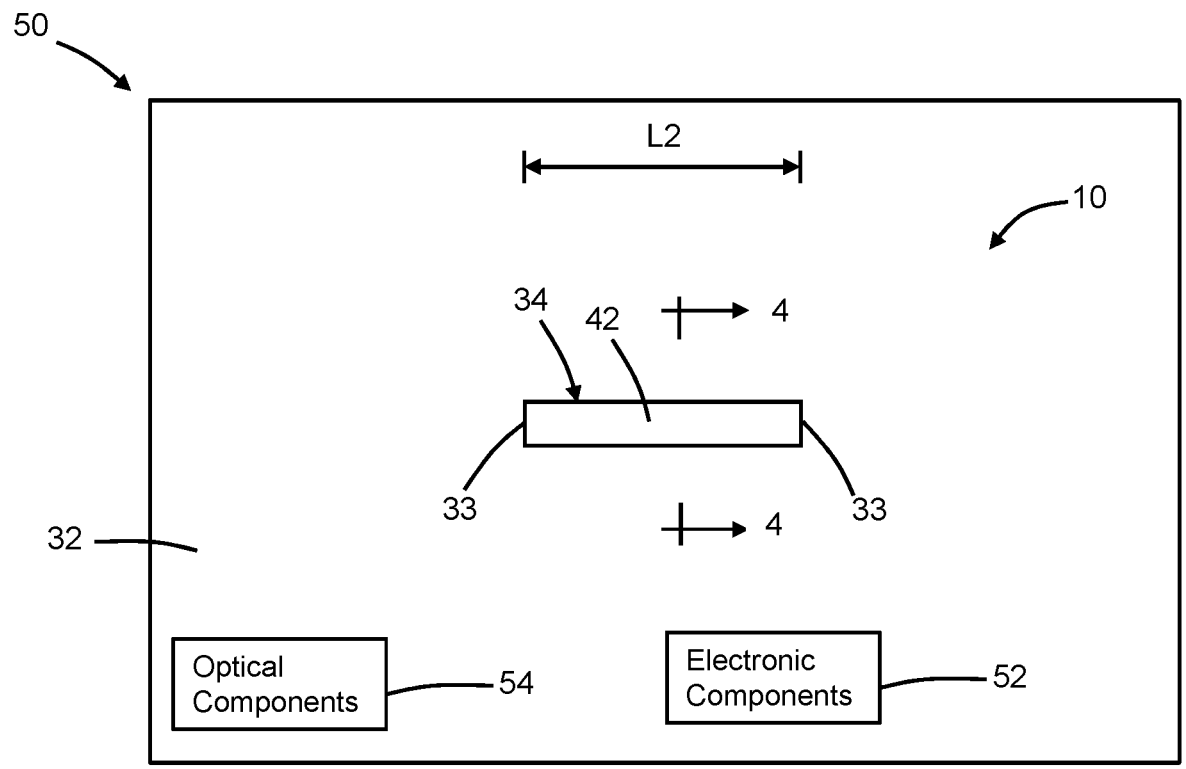
FIG. 3 is a top view of the structure at a fabrication stage subsequent to FIG. 1.
Figure 4:
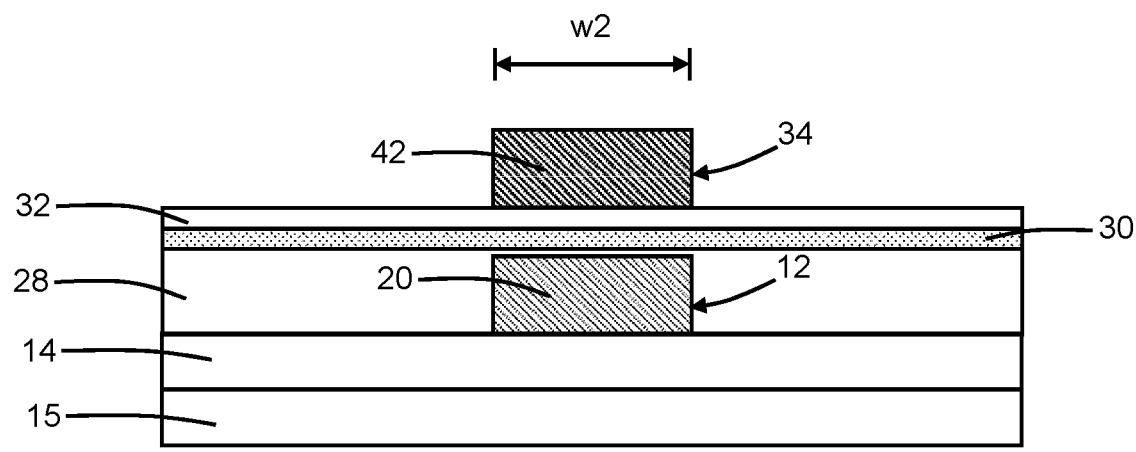
FIG. 4 is a cross-sectional view taken generally along line 4-4 in FIG. 3.

With reference to FIGS. 3, 4 in which like reference numerals refer to like features in FIGS. 1, 2 and at a subsequent fabrication stage, dielectric layers 28, 30, 32 are formed over the waveguide core 12. The dielectric layers 28, 32 may be composed of a dielectric material, such as silicon dioxide, deposited by atomic layer deposition or chemical vapor deposition. The dielectric layer 28 may be planarized after deposition with, for example, chemical mechanical polishing to remove topography. The dielectric layer 30, which is optional, may be composed of dielectric material, such as silicon nitride, deposited by chemical vapor deposition or atomic layer deposition over the dielectric layer 28, and the dielectric layer 32 is deposited over the dielectric layer 30.

A truncated waveguide core 34 is formed on the dielectric layer 32. The truncated waveguide core 34 includes opposite terminating ends 33 and a section 42 that is positioned over the section 20 of the waveguide core 12. The section 42 of the waveguide core 34 is longitudinally arranged between the terminating ends 33. In an embodiment, the terminating ends 33 are located such that no portion of the section 42 of the truncated waveguide core 34 extends over the tapered section 16 of the waveguide core 12 or the tapered section 18 of the waveguide core 12. In that regard, one of the terminating ends 33 may coincide with the interface at the intersection of the tapered section 16 and section 20 and the other of the terminating ends 33 may coincide with the interface at the intersection of the tapered section 18 and section 20.

The truncated waveguide core 34 may be formed from a layer of a dielectric material, such as silicon nitride, that is deposited and patterned by lithography and etching processes. The section 42 of the truncated waveguide core 34 may have a length, L2, between its opposite terminating ends 33 that is equal or substantially equal to the length of the section 20 of the waveguide core 12. The section 42 of the truncated waveguide core 34 and the section 20 of the waveguide core 12 may be straight over their respective lengths with respective straight sidewalls that are planar. The truncated waveguide core 34 does not directly contact the waveguide core 12, but is instead separated from the waveguide core 12 by the dielectric material of the dielectric layers 28, 30, 32.

Optical signals propagating as light with both transverse magnetic (TM) and transverse electric (TE) mode components may be guided on the photonics chip 50 by the section 22 of the waveguide core 12 to the structure 10. One mode component, such as the TE mode component (e.g., the fundamental TE mode component), of the light may be laterally coupled from the waveguide core 12 to the surroundings due to phase matching and dropped. The dropped mode component of the light is absorbed within other elements of the structure 10. The narrowing of the structure 10 at the tapered section 16 and the narrow relative width of the section 20 may promote the selective transfer of light out of the waveguide core 12 for absorption. The addition of the truncated waveguide core 34 enhances the efficiency of the lateral coupling and absorption. The non-dropped mode component, such as the TM mode component, of the light passes through the structure 10 with negligible loss to be further guided by the section 24 of the waveguide core 12 on the photonics chip 50 to a downstream destination.

The truncated waveguide core 34 promotes a reduction in the size (i.e., footprint) of the structure 10 needed to filter light of mixed polarization into light having a well-defined polarization. The size reduction afforded by the introduction of the truncated waveguide core 34 increases the available layout area on the photonics chip 50 for the placement of other components.

In an alternative embodiment, the truncated waveguide core 34 may be composed of a metal instead of a dielectric material. For example, the truncated waveguide core 34 may be composed of copper. In an alternative embodiment, the truncated waveguide core 34 may be composed of polysilicon instead of a dielectric material.

The width, w1, of the section 20 of the waveguide core 12 and the width, w2, of the section 42 of the truncated waveguide core 34 may be equal or substantially equal. The equal or substantially equal widths w1, w2 may be selected to be less than or equal to the wavelength of the light being polarized divided by two times the index of refraction of the material of the truncated waveguide core 34. For example, at a wavelength of 1310 nanometers (nm), the sections 20, 42 may have a width that is less than or equal to 330 nm if the truncated waveguide core 34 is composed of silicon nitride (refractive index=2). As another example, at a wavelength of 1310 nanometers (nm), the sections 20, 42 may have a width that is less than or equal to 190 nm if the truncated waveguide core 34 is composed of polysilicon (refractive index=3.5).

Figure 5:
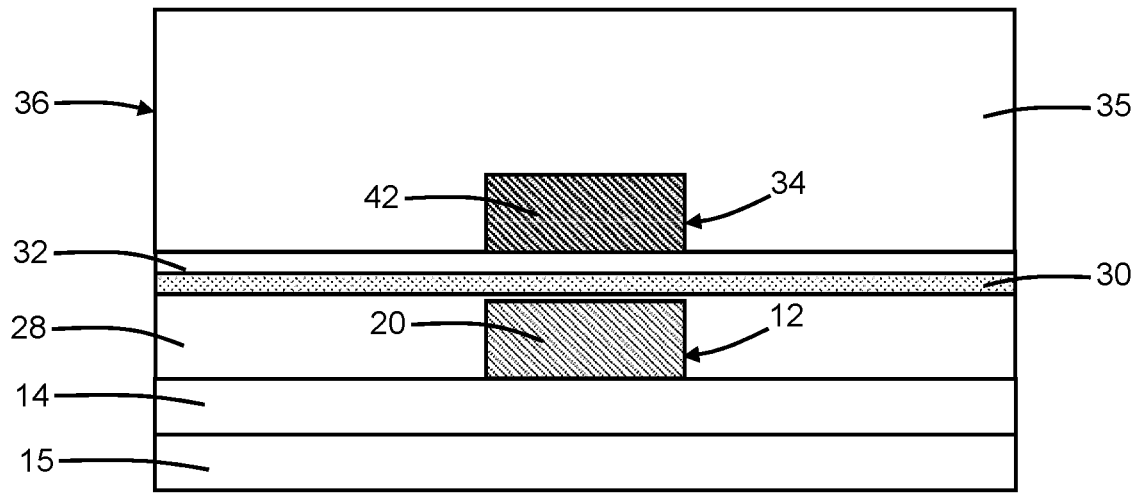
FIG. 5 is a cross-sectional view of the structure at a fabrication stage subsequent to FIG. 4.

With reference to FIG. 5 in which like reference numerals refer to like features in FIG. 4 and at a subsequent fabrication stage, a back-end-of-line stack 36 is formed over the waveguide core 12 and truncated waveguide core 34 of the structure 10. The back-end-of-line stack 36 may include one or more interlayer dielectric layers 35 composed of one or more dielectric materials, such as a carbon-doped silicon oxide, and metallization (e.g., contacts and wiring) composed of, for example, copper, tungsten, and/or cobalt that is arranged in the one or more interlayer dielectric layers 35. The truncated waveguide core 34 is a passive element that is not, for example, connected with contacts and wiring in the back-end-of-line stack 36, and the back-end-of-line stack 36 may be free of metallization over the structure 10.

The structure 10, in any of its embodiments described herein, may be integrated into a photonics chip 50 that includes electronic components 52 and additional optical components 54. For example, the electronic components 52 may include field-effect transistors that are fabricated by CMOS front-end-of-line (FEOL) processing.

Figure 6:
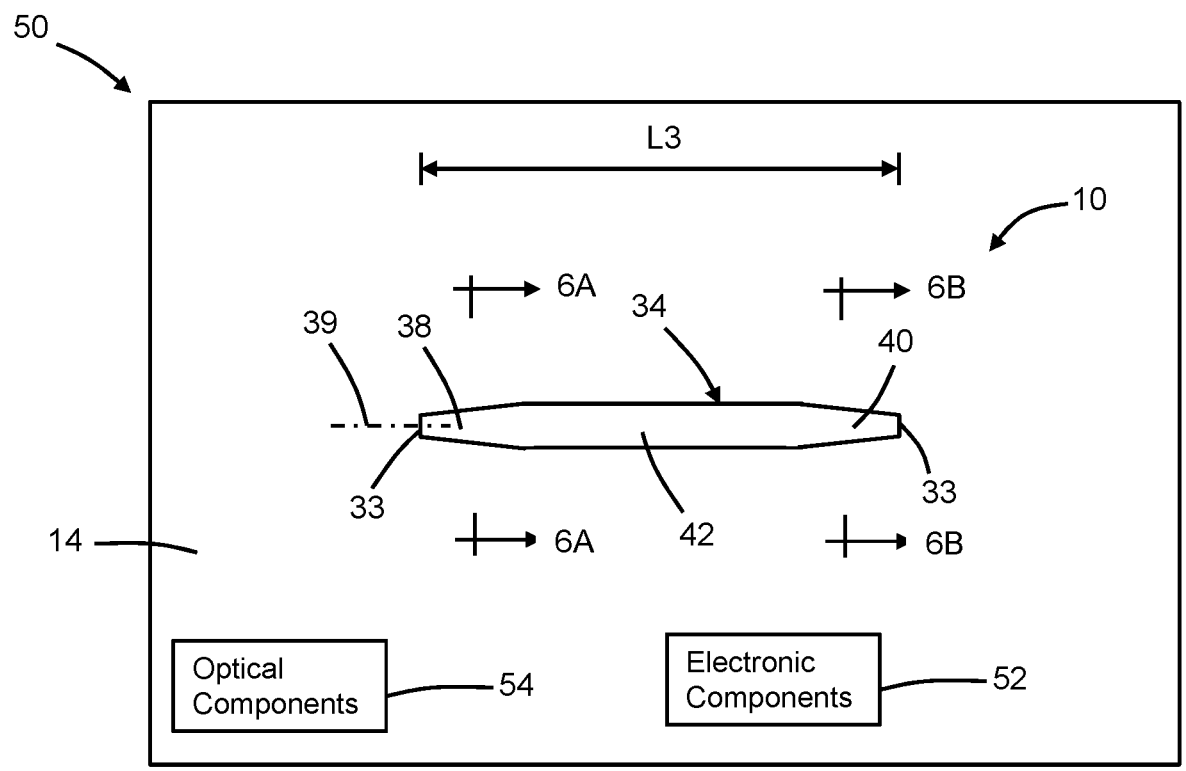
FIG. 6 is a top view of a structure in accordance with alternative embodiments of the invention.
Figure 6A:
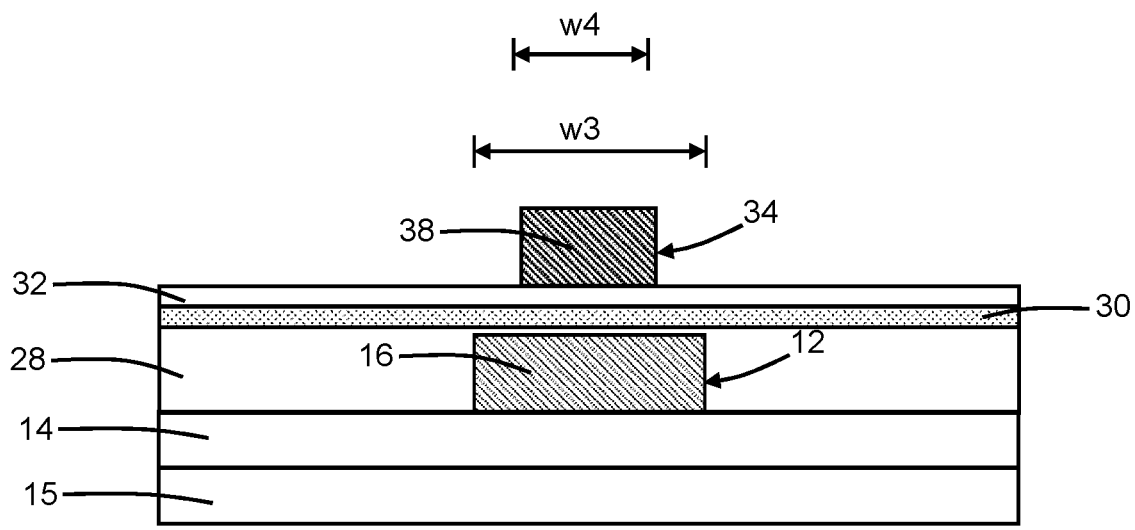
FIG. 6A is a cross-sectional view taken generally along line 6A-6A in FIG. 6.
Figure 6B:
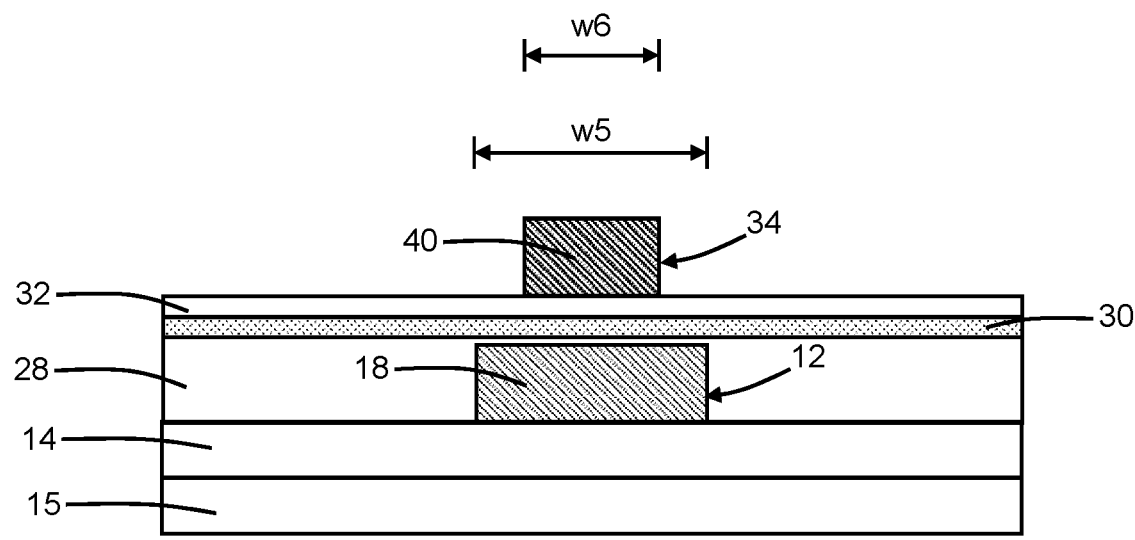
FIG. 6B is a cross-sectional view taken generally along line 6B-6B in FIG. 6.

With reference to FIGS. 6, 6A, 6B in which like reference numerals refer to like features in FIG. 3 and in accordance with alternative embodiments of the invention, the section 42 of the truncated waveguide core 34 may be arranged along a longitudinal axis 39 between a tapered section 38 and a tapered section 40. The tapered section 38, which is positioned over the tapered section 16 of the waveguide core 12, terminates the waveguide core 12 and defines one terminating end 33. The tapered section 40, which is positioned over the tapered section 18 of the waveguide core 12, terminates the waveguide core 12 and defines the opposite terminating end 33. The section 42 of the truncated waveguide core 34 is positioned over the section 20 of the waveguide core 12. The tapered sections 38, 40 taper in an opposite direction relative to the tapered sections 16, 18 in that the tapered sections 38, 40 each narrow with increasing distance from the section 42, which differs from the tapered sections 16, 18 that each widen with increasing distance from the section 20. The total length, L3, of the tapered sections 38, 40 and section 42 of the truncated waveguide core 34 may be less than the length, L1, of the tapered sections 16, 18 and section 20 of the waveguide core 12. The tapered width, w3, of the tapered section 16 may greater than the tapered width, w4, of the tapered section 38 over their respective tapered lengths, and the tapered width, w5, of the tapered section 18 may greater than the tapered width, w6, of the tapered section 40 over their respective tapered lengths.

Figure 7:
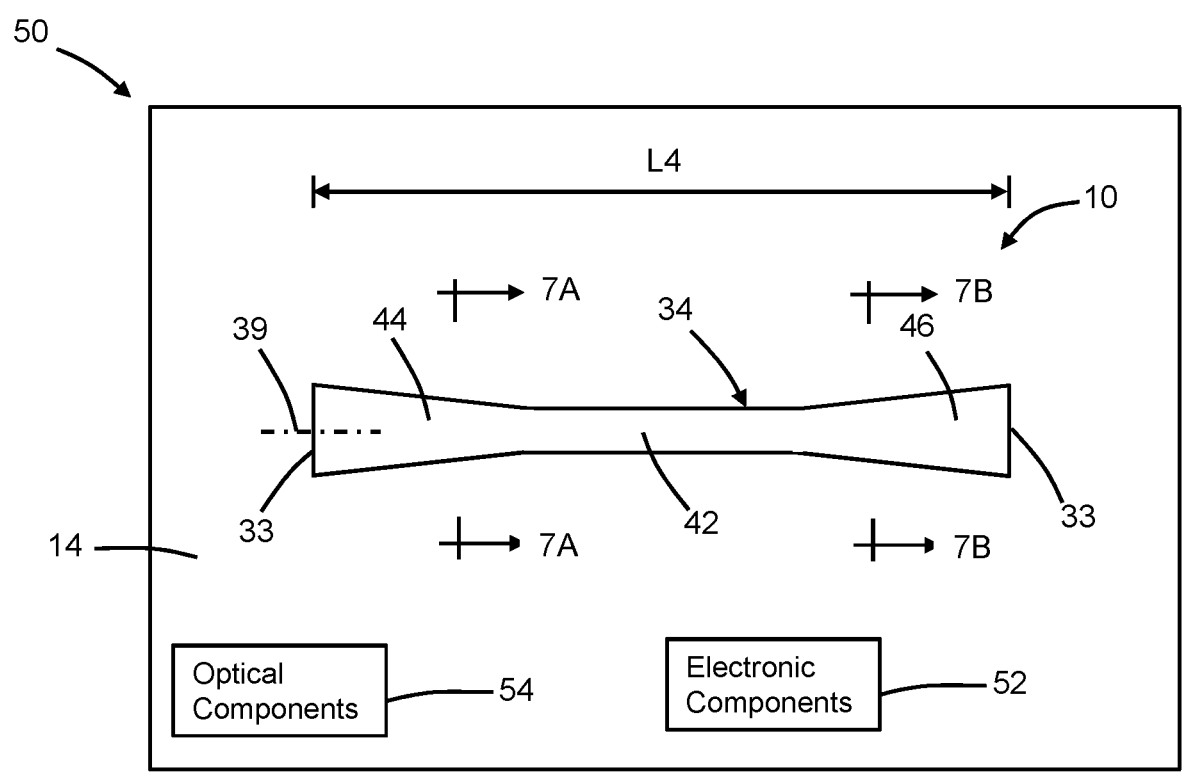
FIG. 7 is a top view of a structure in accordance with alternative embodiments of the invention.
Figure 7A:
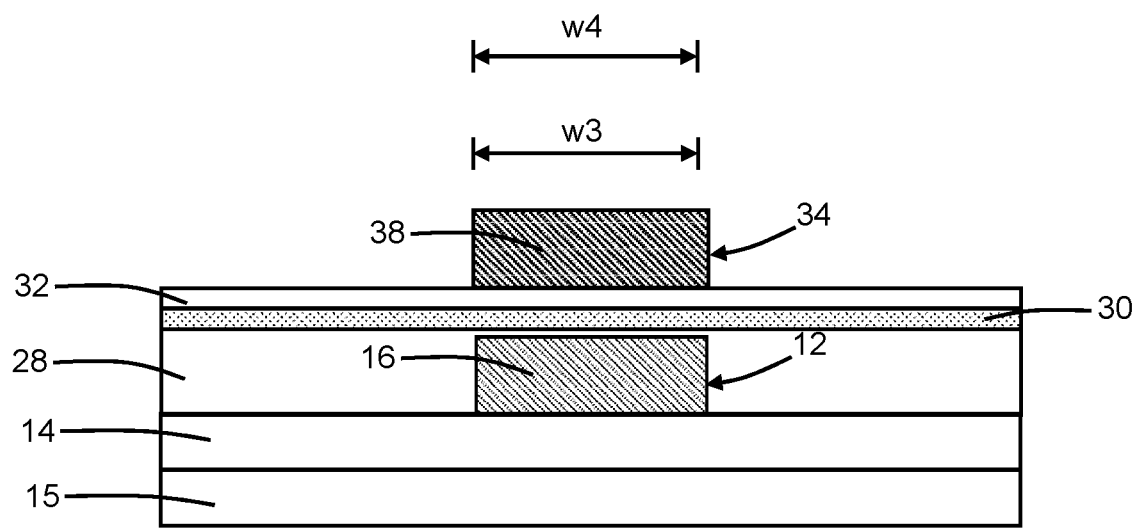
FIG. 7A is a cross-sectional view taken generally along line 7A-7A in FIG. 7.
Figure 7B:
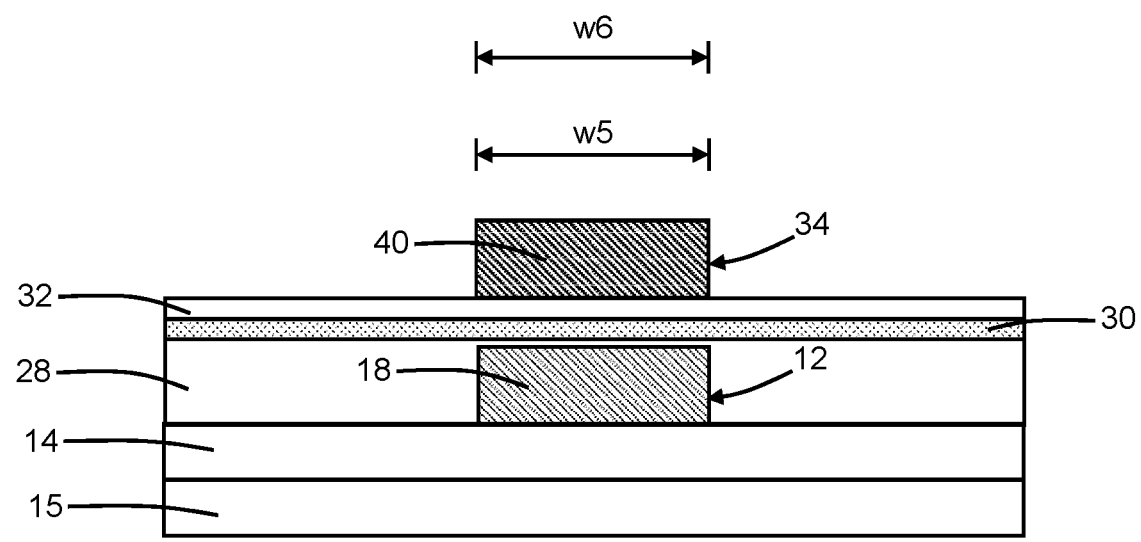
FIG. 7B is a cross-sectional view taken generally along line 7B-7B in FIG. 7.

With reference to FIGS. 7, 7A, 7B in which like reference numerals refer to like features in FIG. 3 and in accordance with alternative embodiments of the invention, the section 42 of the truncated waveguide core 34 may be arranged along the longitudinal axis 39 between a tapered section 44 and a tapered section 46. The tapered section 44, which is positioned over the tapered section 16 of the waveguide core 12, terminates the waveguide core 12 and defines one terminating end 33. The tapered section 46, which is positioned over the tapered section 18 of the waveguide core 12, terminates the waveguide core 12 and defines the opposite terminating end 33. The section 42 of the truncated waveguide core 34 is positioned over the section 20 of the waveguide core 12. The tapered sections 44, 46 taper in the same direction as the tapered sections 16, 18 in that the tapered sections 44, 46 each widen with increasing distance from the section 42. In an embodiment, the tapered sections 44, 46 may have lateral dimensions (i.e., length and width) that are respectively equal or substantially equal to the lateral dimensions (i.e., length and width) of the tapered sections 16, 18. In particular, the total length, L4, of the section 42 and tapered sections 44, 46 of the truncated waveguide core 34 may be equal or substantially equal to the length, L1, of the tapered sections 16, 18 and section 20 of the waveguide core 12, the tapered width, w3, of the tapered section 16 and tapered width, w5, of the tapered section 38 may be equal or approximately equal over their respective tapered lengths, and the tapered width, w5, of the tapered section 18 and tapered width, w6, of the tapered section 40 may be equal or approximately equal over their respective tapered lengths.

Figure 8:
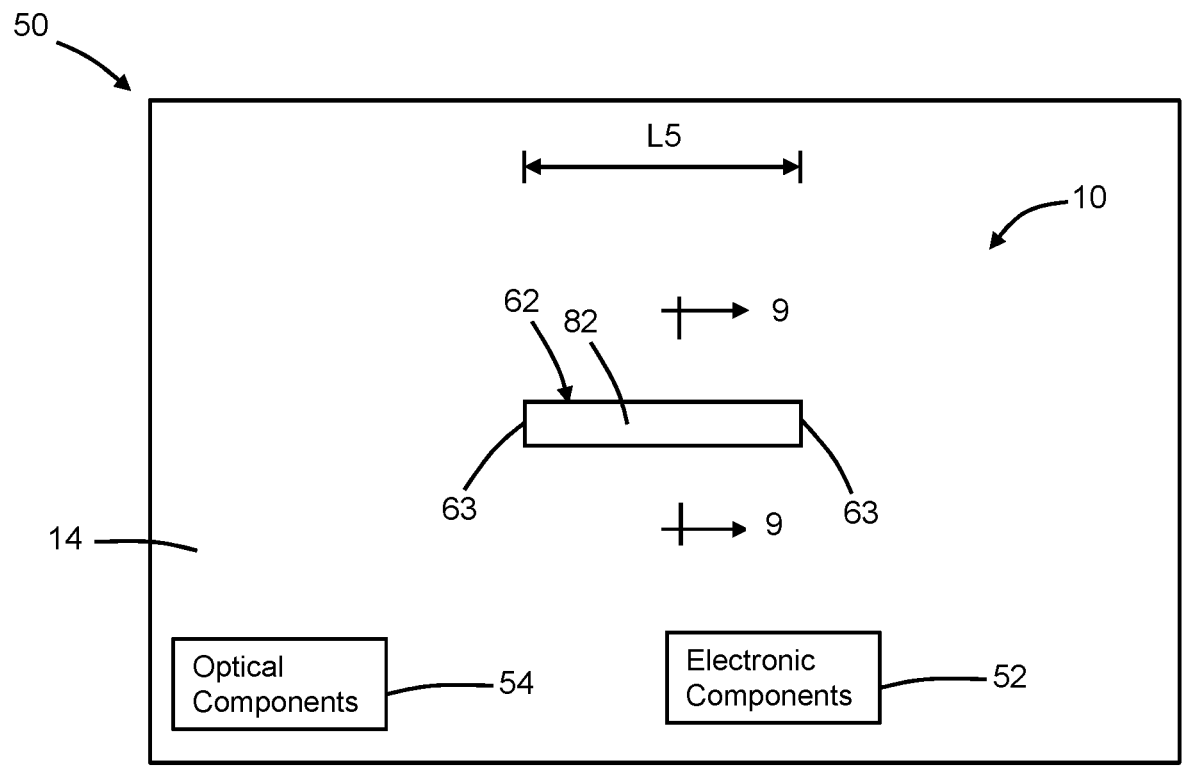
FIG. 8 is a top view of a structure at an initial fabrication stage of a processing method in accordance with embodiments of the invention.
Figure 9:
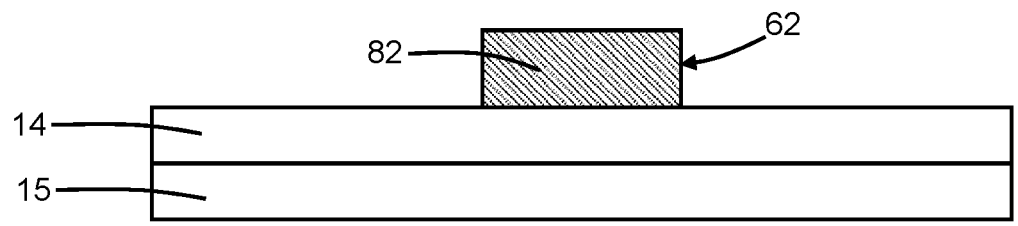
FIG. 9 is a cross-sectional view taken generally along line 9-9 in FIG. 8.

With reference to FIGS. 8, 9 in which like reference numerals refer to like features in FIGS. 1, 2 and in accordance with alternative embodiments of the invention, a truncated waveguide core 62 is formed on the dielectric layer 14. The truncated waveguide core 62 may be formed in a manner similar to waveguide core 12 by patterning a single-crystal semiconductor material, such as single-crystal silicon from a device layer of a silicon-on-insulator (SOI) wafer, with lithography and etching processes. The truncated waveguide core 62 may be a section 82 that has a length, L5, between its opposite terminating ends 63.

Figure 10:
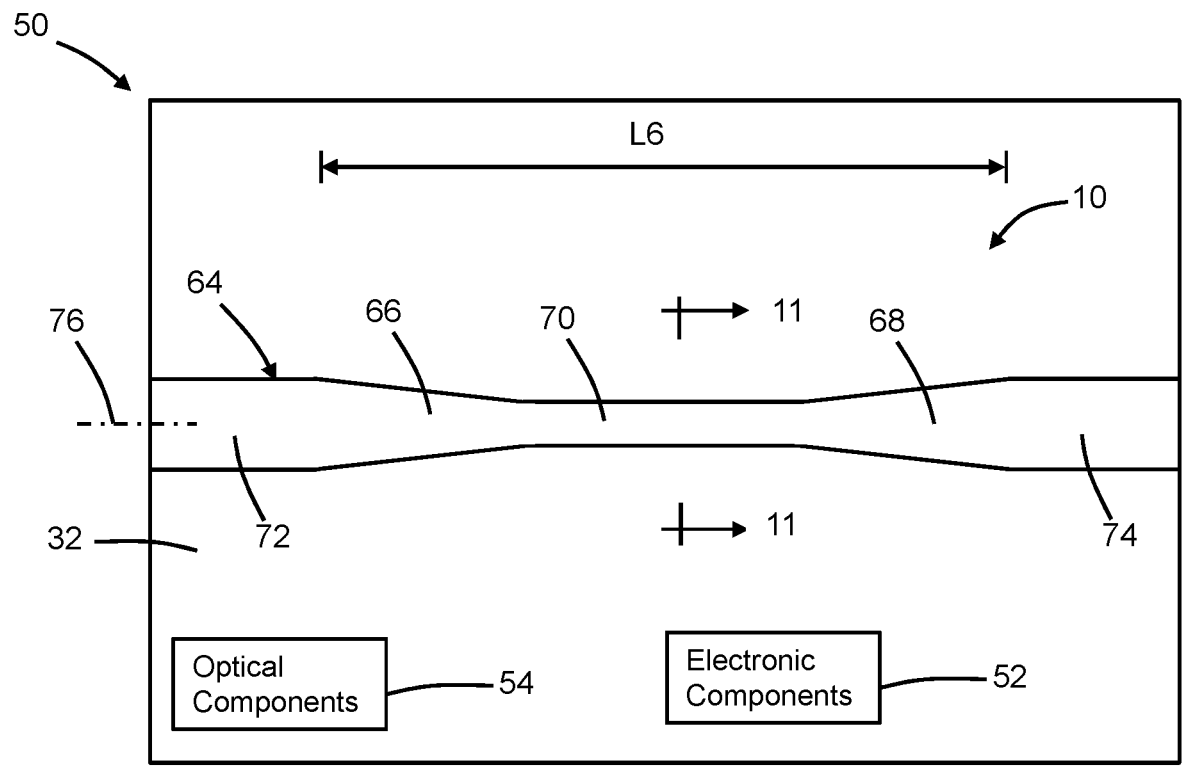
FIG. 10 is a top view of the structure at a fabrication stage subsequent to FIG. 8.
Figure 11:
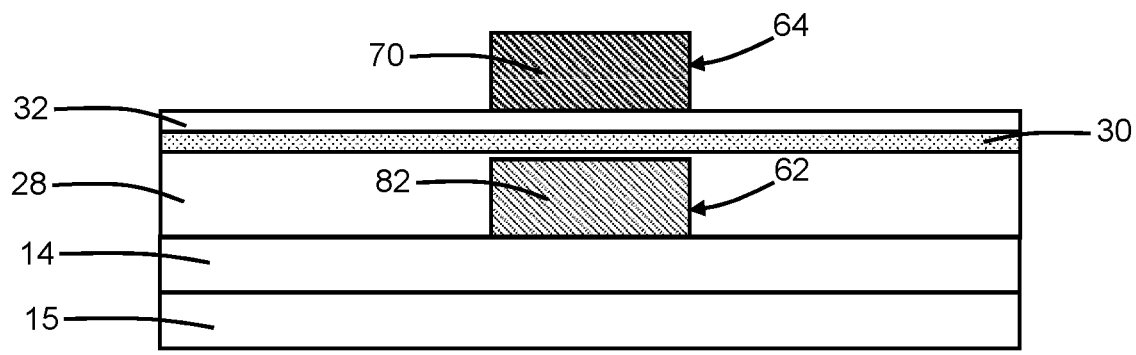
FIG. 11 is a cross-sectional view taken generally along line 11-11 in FIG. 10.

With reference to FIGS. 10, 11 in which like reference numerals refer to like features in FIGS. 8, 9 and at a subsequent fabrication stage, the dielectric layers 28, 30, 32 are formed over the truncated waveguide core 62. A waveguide core 64 is formed on the dielectric layer 32. The waveguide core 64 may be formed from a layer of a dielectric material, such as silicon nitride, that is deposited and patterned by lithography and etching processes. The waveguide core 64 includes a tapered section 66, a tapered section 68, and a section 70 that collectively join a section 72 and a section 74. Each of the sections 72, 74 has a greater width than the section 70. The section 70 is arranged between the tapered section 66 and the tapered section 68 along a longitudinal axis 76 of the waveguide core 64. In an embodiment, the section 70 may be centrally-located between tapered sections 66, 68, which may have equal dimensions. The tapered sections 66, 68 and section 70 may have a total length, L6, measured from an interface at the intersection of the tapered section 66 and section 72 to another interface at the intersection of the tapered section 68 and section 74, and a thickness that may be constant over the total length. The tapered sections 66, 68 each narrow in width in a direction toward the section 70.

The section 70 of the waveguide core 64 is positioned over the section 82 of the truncated waveguide core 62. In an embodiment, no portion of the truncated waveguide core 62 extends below the tapered section 66 of the waveguide core 64 or below the tapered section 68 of the waveguide core 64. The section 70 of the waveguide core 64 may have a length that is equal or substantially equal to the length of the section 82 of the truncated waveguide core 62. The section 82 of the truncated waveguide core 62 and the section 70 of the waveguide core 64 may have equal or substantially equal lengths. The section 82 of the truncated waveguide core 62 and the section 70 of the waveguide core 64 may be straight over their respective lengths with respective straight sidewalls that are planar. The truncated waveguide core 62 does not directly contact the waveguide core 64, but is instead separated from the waveguide core 12 by dielectric material from the dielectric layers 28, 30, 32.

Figure 12:
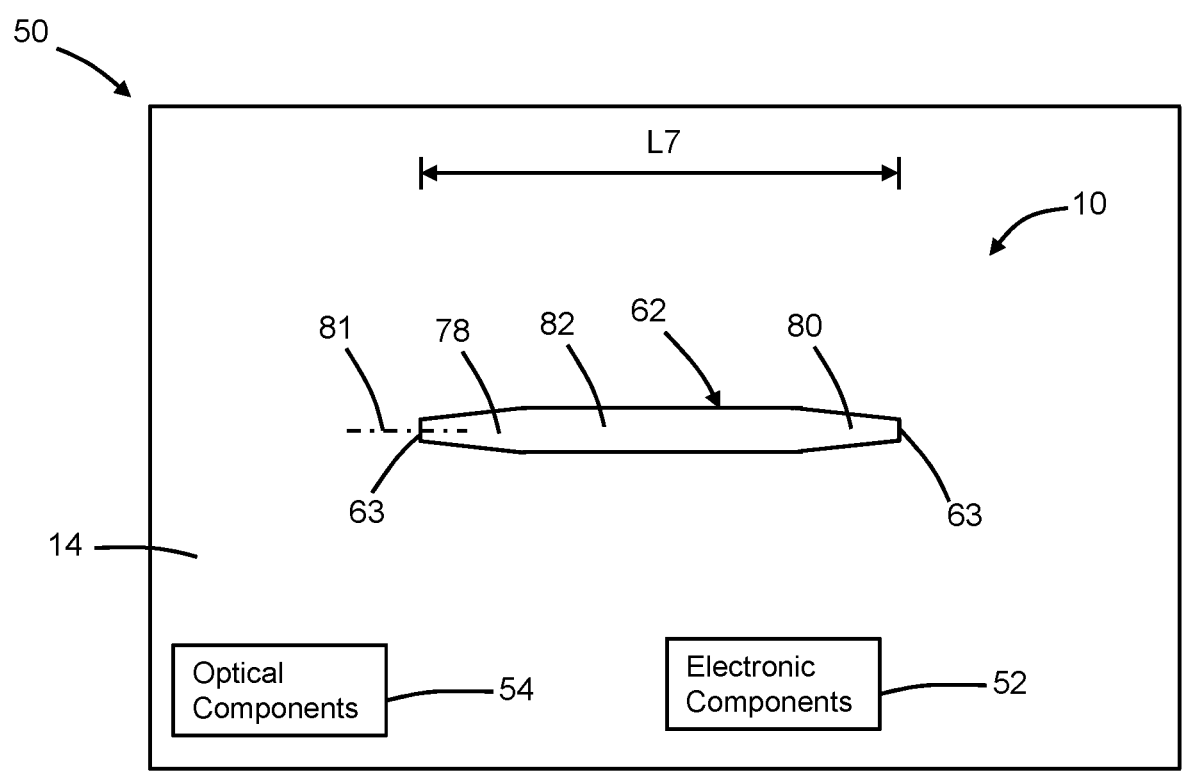
FIGS. 12 and 13 are top views of structures in accordance with alternative embodiments of the invention.

With reference to FIG. 12 in which like reference numerals refer to like features in FIG. 8 and in accordance with alternative embodiments of the invention, the section 82 of the truncated waveguide core 62 may be arranged between a tapered section 78 and a tapered section 80 along a longitudinal axis 81. The tapered section 78, which is positioned under or below the tapered section 66 of the waveguide core 64, terminates the truncated waveguide core 62 and provides one terminating end 63. The tapered section 80, which is positioned under or below the tapered section 68 of the waveguide core 64, terminates the truncated waveguide core 62 and provides the opposite terminating end 63. The section 82 of the truncated waveguide core 62 is positioned over the section 70 of the waveguide core 64. The tapered sections 78, 80 taper in an opposite direction relative to tapered sections 68, 70 in that the tapered sections 78, 80 each narrow with increasing distance from the section 82, which differs from the tapered sections 66, 68 that each widen with increasing distance from the section 70. The total length, L7, of the tapered sections 78, 80 and section 82 of the truncated waveguide core 62 is less than the length of the tapered sections 66, 68 and section 70 of the truncated waveguide core 64.

Figure 13:
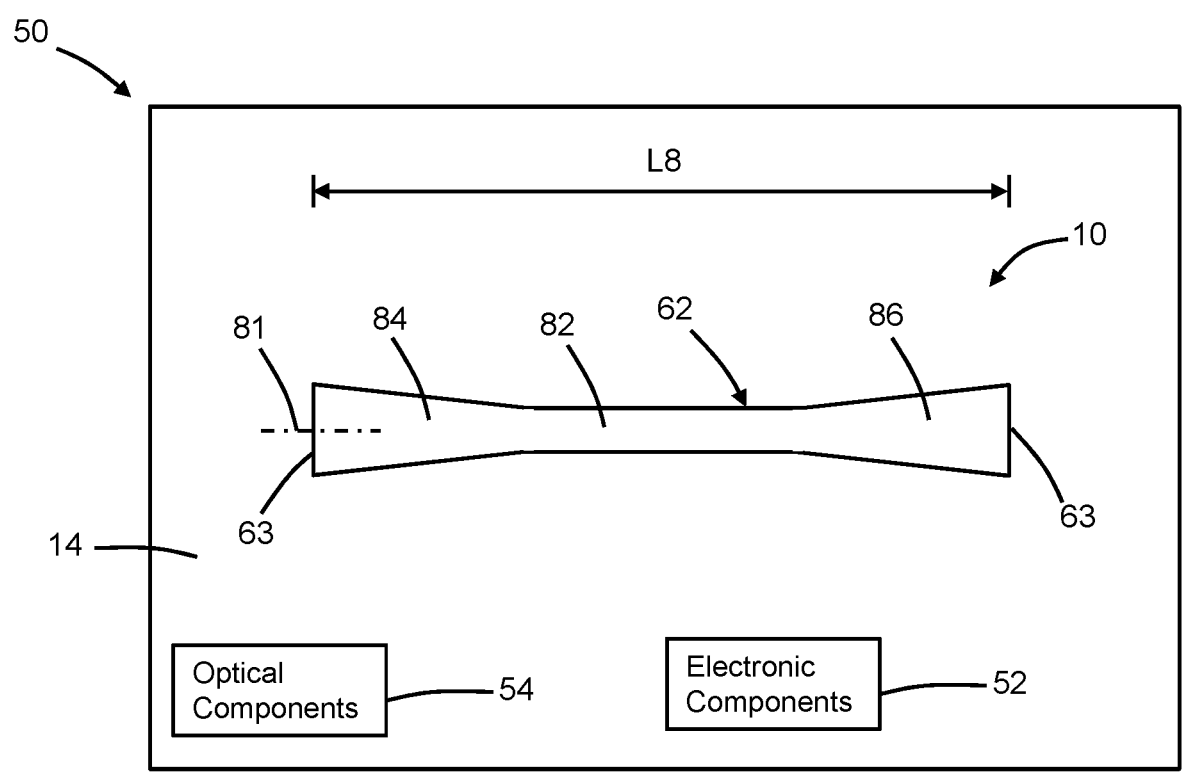

With reference to FIG. 13 in which like reference numerals refer to like features in FIG. 9 and in accordance with alternative embodiments of the invention, the section 82 of the truncated waveguide core 62 may be arranged along the longitudinal axis 81 between a tapered section 84 and a tapered section 86. The tapered section 84, which is positioned over the tapered section 66 of the waveguide core 64, terminates the truncated waveguide core 62 at one terminating end 63. The tapered section 86, which is positioned over the tapered section 68 of the waveguide core 64, terminates the truncated waveguide core 62 at the opposite terminating end 63. The section 82 of the truncated waveguide core 62 is positioned over the section 70 of the waveguide core 64. The tapered sections 84, 86 taper in the same direction as the tapered sections 68, 70 in that the tapered sections 84, 86 each widen with increasing distance from the section 82. In an embodiment, the tapered sections 84, 86 may have lateral dimensions (i.e., length and width) that are respectively equal or substantially equal to the lateral dimensions (i.e., length and width) of the tapered sections 66, 68. In particular, the total length, L8, of the tapered sections 84, 86 and section 82 of the truncated waveguide core 62 may be equal or substantially equal to the length, L6, of the tapered sections 66, 68 and section 70 of the truncated waveguide core 64.

Figure 14:
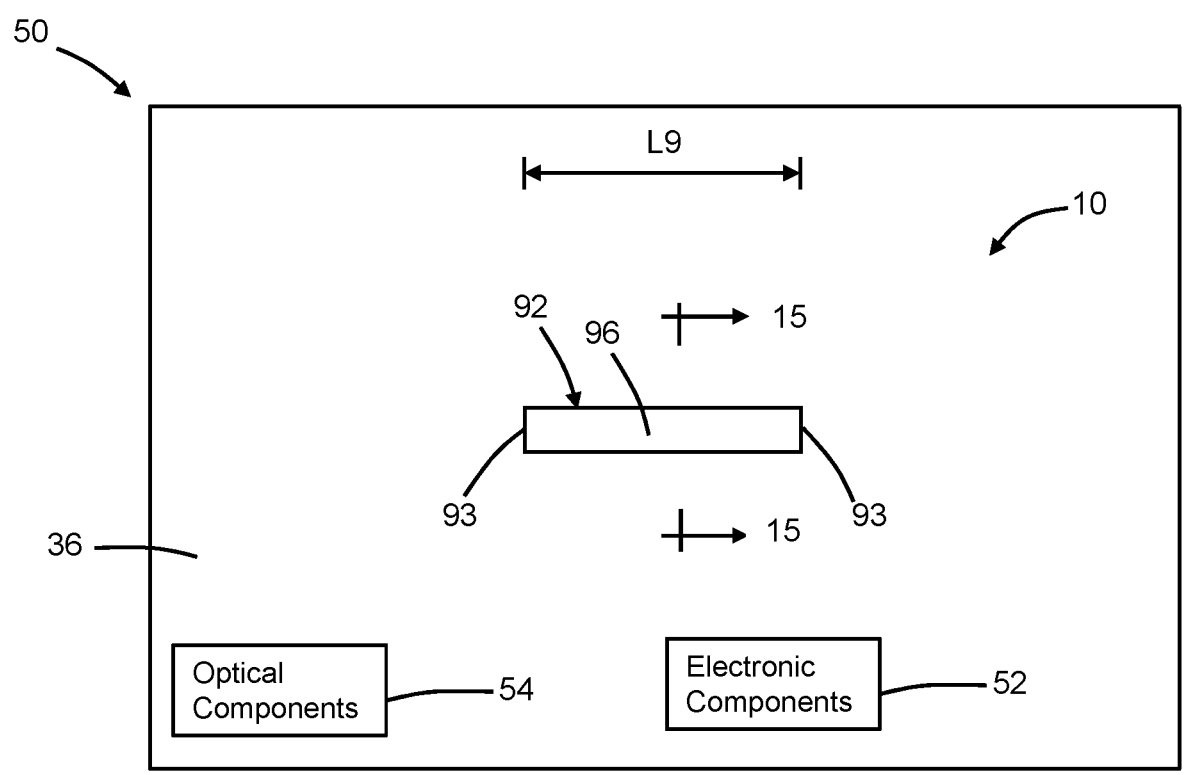
FIG. 14 is a top view of a structure in accordance with alternative embodiments of the invention.
Figure 15:
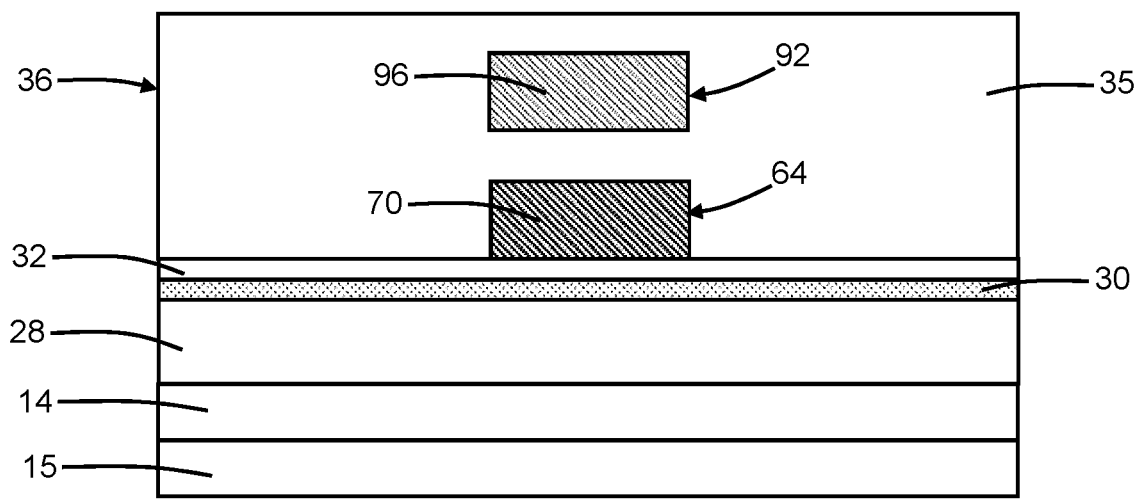
FIG. 15 is a cross-sectional view taken generally along line 15-15 in FIG. 14.

With reference to FIGS. 14, 15 in which like reference numerals refer to like features in FIGS. 11, 12 and in accordance with alternative embodiments of the invention, a truncated waveguide core 92 is formed that includes a section 96 that is positioned in a vertical direction over the section 70 of the waveguide core 64. The truncated waveguide core 92 is positioned in the back-end-of-line stack 36 and replaces the truncated waveguide core 62 in the structure 10. The truncated waveguide core 92 may be formed by patterning a deposited layer of material, such as a metal like copper, or by a damascene process. The section 96 of the truncated waveguide core 92 may be non-tapered or straight and may have a length, L9, between its opposite terminating ends 93. The section 96 of the truncated waveguide core 92 is positioned over the section 70 of the waveguide core 64, and dielectric material from the interlayer dielectric layers 35 of the back-end-of-line stack 36 is positioned as a layer between the truncated waveguide core 92 and the waveguide core 64. The section 96 of the truncated waveguide core 92 and the section 70 of the waveguide core 64 may be straight over their respective lengths and have respective straight sidewalls that are planar.

Figure 16:
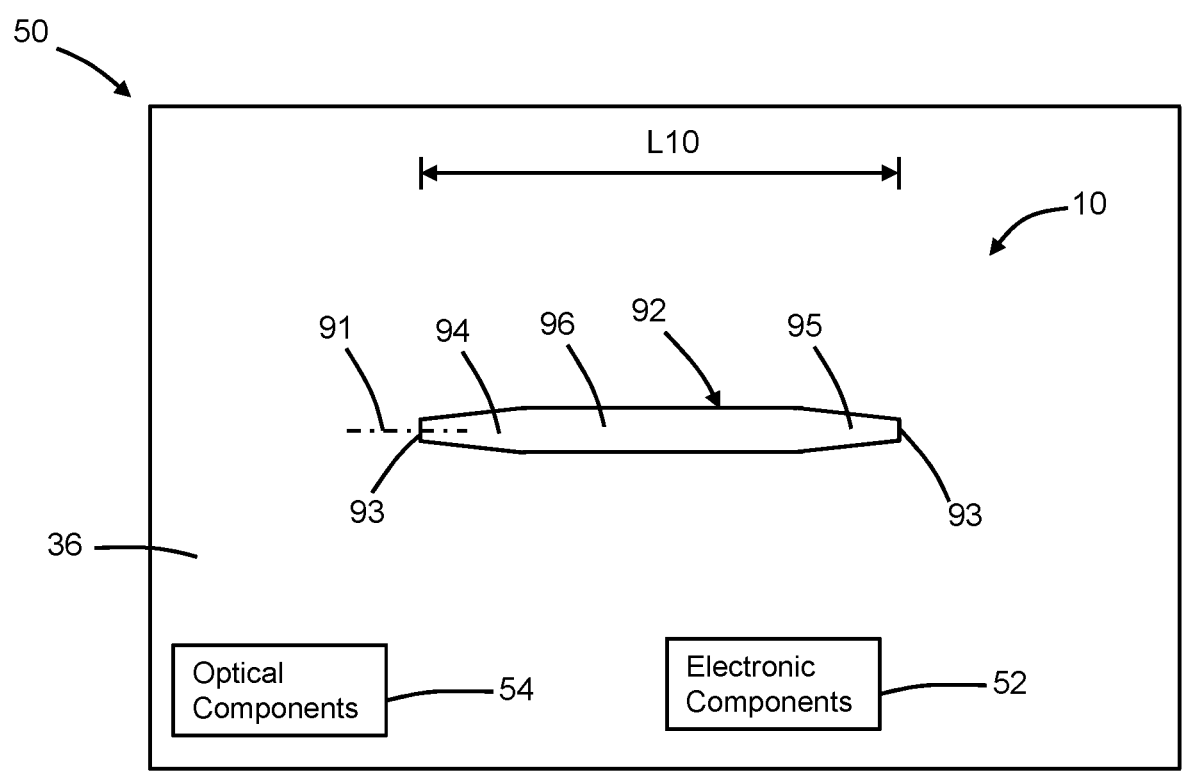
FIGS. 16 and 17 are top views of structures in accordance with embodiments of the invention.

With reference to FIG. 16 in which like reference numerals refer to like features in FIG. 14 and in accordance with alternative embodiments of the invention, the section 96 of the truncated waveguide core 92 may be arranged along a longitudinal axis 91 between a tapered section 94 and a tapered section 95. The tapered section 94, which is positioned above the tapered section 66 of the waveguide core 64, terminates the truncated waveguide core 92 and defines one terminating end 93. The tapered section 95, which is positioned above the tapered section 68 of the waveguide core 64, terminates the truncated waveguide core 92 and defines the opposite terminating end 93. The section 96 of the truncated waveguide core 92 is positioned over the section 70 of the waveguide core 64. The tapered sections 94, 95 taper in an opposite direction relative to the tapered sections 68, 70 in that the tapered sections 94, 95 each narrow with increasing distance from the section 96, which differs from the tapered sections 66, 68 that each widen with increasing distance from the section 70. The total length, L10, of the tapered sections 94, 95 and section 96 of the truncated waveguide core 92 is less than the length of the tapered sections 66, 68 and section 70 of the waveguide core 64.

Figure 17:
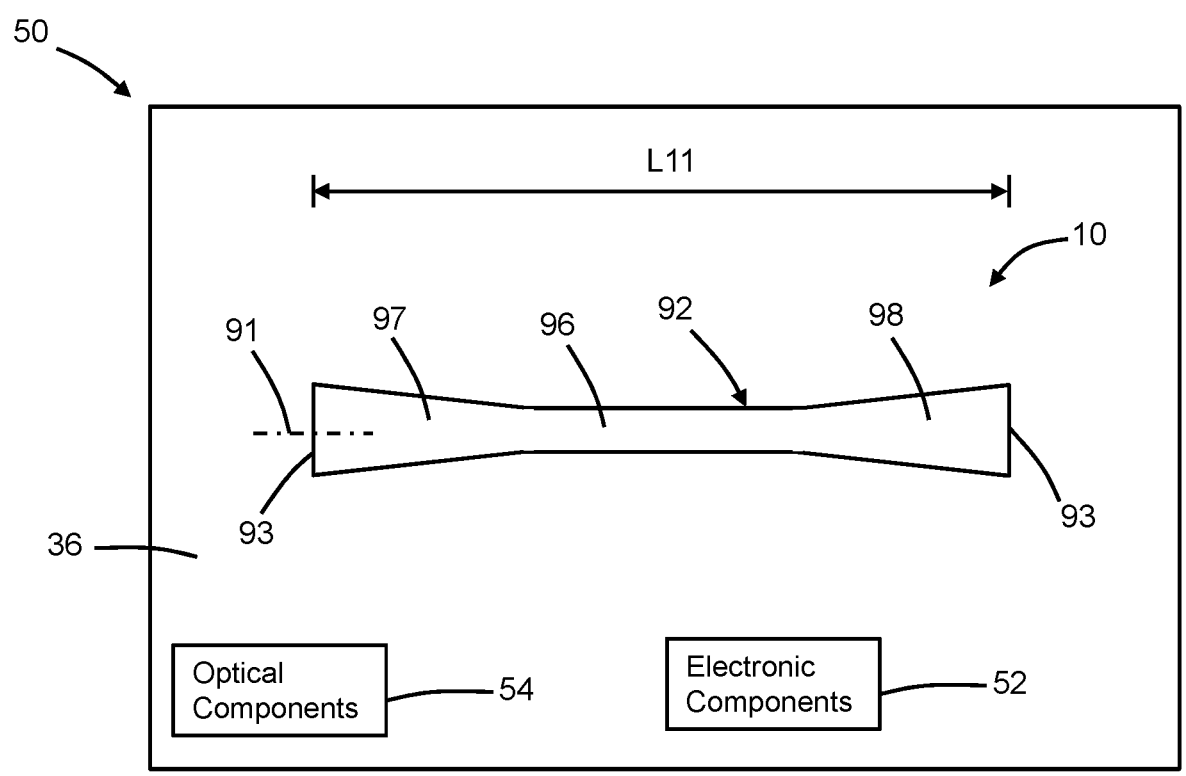

With reference to FIG. 17 in which like reference numerals refer to like features in FIG. 14 and in accordance with alternative embodiments of the invention, the section 96 of the truncated waveguide core 92 may be arranged along the longitudinal axis 91 between a tapered section 97 and a tapered section 98. The tapered section 97, which is arranged over the tapered section 66 of the waveguide core 64, terminates the truncated waveguide core 92 and defines one terminating end 93. The tapered section 98, which is arranged over the tapered section 68 of the waveguide core 64, terminates the truncated waveguide core 92 and defines the opposite terminating end 93. The section 96 of the truncated waveguide core 92 is positioned over the section 70 of the waveguide core 64. The tapered sections 97, 98 taper in the same direction as the tapered sections 66, 68 in that the tapered sections 97, 98 each widen with increasing distance from the section 96. In an embodiment, the tapered sections 97, 98 may have lateral dimensions (i.e., length and width) that are respectively equal or substantially equal to the lateral dimensions (i.e., length and width) of the tapered sections 66, 68. In particular, the total length, L11, of the tapered sections 97, 98 and section 96 of the truncated waveguide core 92 may be equal or substantially equal to the length, L6, of the tapered sections 66, 68 and section 70 of the waveguide core 64.

Figure 18:
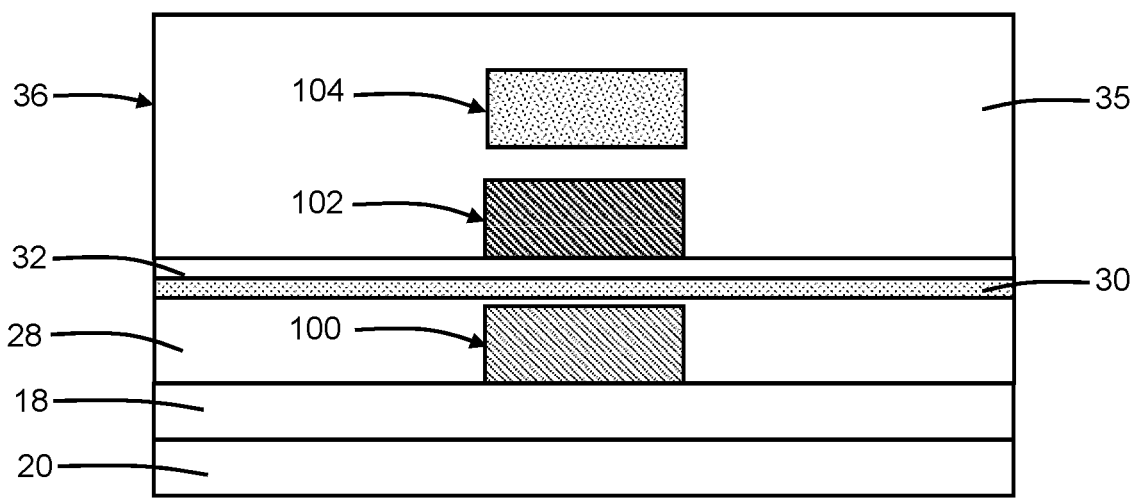
FIG. 18 is a cross-sectional view of a structure in accordance with embodiments of the invention.

With reference to FIG. 18 and in accordance with alternative embodiments of the invention, the structure 10 may be modified to include a layer stack having more than two layers. Specifically, the layer stack may include a waveguide core 100, a waveguide core 102, and a waveguide core 104. The waveguide core 104 may be composed of a metal (e.g., copper) and may be truncated as shown in FIGS. 14-17. The waveguide core 102 may be composed of a dielectric material (e.g., silicon nitride) and may be either truncated as shown in FIGS. 3-7 or non-truncated and a light carrier as shown in FIGS. 10-11. In the former regard, the waveguide core 100 may be composed of single-crystal semiconductor material (e.g., single-crystal silicon) and may be non-truncated and a light carrier as shown in FIGS. 1, 2. In the latter regard, the waveguide core 100 may be composed of single-crystal semiconductor material (e.g., single-crystal silicon) and may be truncated as shown in FIGS. 8-13. Portions of the dielectric layers 28, 30, 32 may be positioned between the waveguide core 100 and the waveguide core 102, which have a non-contacting relationship. Portions of the one or more interlayer dielectric layers 35 may be positioned between the waveguide core 102 and the waveguide core 104, which have a non-contacting relationship.

Figure 19:
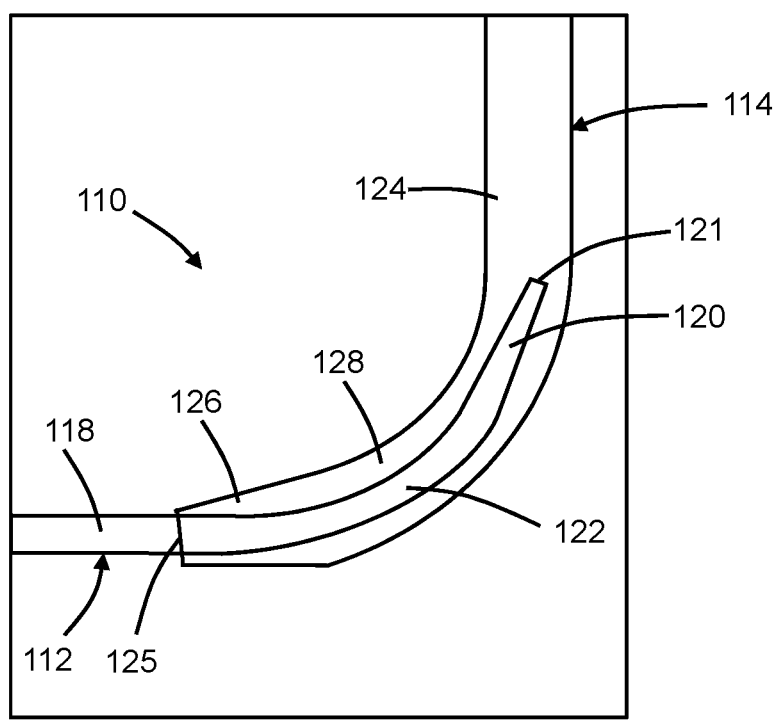
FIG. 19 is a diagrammatic top view of a layout for a structure in accordance with embodiments of the invention.

With reference to FIG. 19 and in accordance with alternative embodiments of the invention, a structure 110 for a polarizing coupler includes a waveguide core 112 and a waveguide core 114 that is positioned in a vertical direction relative to the waveguide core 112. In an embodiment, the waveguide core 114 may be positioned in a level of the photonics chip 50 that is over the level of the waveguide core 112. In an alternative embodiment, the waveguide core 114 may be positioned in a level of the photonics chip 50 that is under the level of the waveguide core 112.

The waveguide core 112 includes a straight section 118, a tapered section 120, and a curved section 122 arranged as a bend between the straight section 118 and the tapered section 120. The tapered section 120 terminates at a terminating end 121. The waveguide core 114 includes a straight section 124, a tapered section 126, and a curved section 128 arranged as a bend between the straight section 124 and the tapered section 126. The tapered section 126 terminates at a terminating end 125.

The tapered section 126 and curved section 128 of the waveguide core 114 may be generally arranged in an overlapping relationship with the tapered section 120 and curved section 122 of the waveguide core 112. In an embodiment, the waveguide core 114 may be wider than the waveguide core 112 over the composited length of the overlapping relationships. In an embodiment, the radius of curvature of the curved section 122 and/or the curved section 128 may be constant over their respective arc lengths. In an embodiment, the radius of curvature of the curved section 122 and/or the curved section 128 may be vary over their respective arc lengths. In an embodiment, the tapering of the tapered section 120 and/or the tapering of the tapered section 126 may be linear. In an embodiment, the tapering of the tapered section 120 and/or the tapering of the tapered section 126 may be non-linear.

In an embodiment, the waveguide core 112 may be composed of single-crystal silicon, and the waveguide core 114 may be composed of silicon nitride and positioned over the waveguide core 112. In an embodiment, the waveguide core 112 may be composed of single-crystal silicon, and the waveguide core 114 may be composed of polysilicon and positioned over the waveguide core 112. In an embodiment, the waveguide core 112 may be composed of silicon nitride, and the waveguide core 114 may be composed of polysilicon and positioned under the waveguide core 112. In an embodiment, the waveguide core 112 may be composed of silicon nitride, and the waveguide core 114 may be composed of silicon nitride and positioned over the waveguide core 112.

In use, light propagating in the waveguide core 112 is transferred by the tapered section 120 and curved section 122 to the tapered section 126 and curved section 128 of the waveguide core 114. The transfer from the waveguide core 112 to the waveguide core 114 may be upward if the tapered section 120 and curved section 122 are arranged under the tapered section 126 and curved section 128. The transfer from the waveguide core 112 to the waveguide core 114 may be downward if the tapered section 120 and curved section 122 are arranged over the tapered section 126 and curved section 128. During the transfer, the structure 110 may operate as a polarizer. For example, light entering in the straight section 118 of the waveguide core 112 may include both TM mode and TE mode components and, during the transfer, the TM mode component may be filtered out or dropped such that only the TE mode component exits the structure 110 through the straight section 124 of the waveguide core 114.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a polarizer, the structure comprising:
   a first dielectric layer;
   a first waveguide core having a first tapered section, a second tapered section, and a section positioned along a longitudinal axis between the first tapered section and the second tapered section, and the first tapered section and the second tapered section each widening with increasing distance from the section;
   a second waveguide core including a first terminating end, a second terminating end, and a section that is arranged between the first terminating end and the second terminating end; and
   a third waveguide core including a first terminating end, a second terminating end, and a section that is arranged between the first terminating end and the second terminating end,
   wherein the section of the first waveguide core, the section of the second waveguide core, and the section of the third waveguide core are arranged relative to the first dielectric layer in different layers of a layer stack, the first waveguide core is comprised of a first material, the second waveguide core is comprised of a second material different from the first material, and the third waveguide core is comprised of a third material different from the first material and the second material.

2. The structure of claim 1 wherein the section of the second waveguide core is positioned in the layer stack between the section of the first waveguide core and the section of the third waveguide core.

3. The structure of claim 2 wherein the first material is a semiconductor material, the second material is a dielectric material, and the third material is a metal.

4. The structure of claim 1 wherein the section of the first waveguide core is positioned in the layer stack between the section of the second waveguide core and the section of the third waveguide core.

5. The structure of claim 4 wherein the first material is a dielectric material, the second material is a semiconductor material, and the third material is a metal.

6. The structure of claim 1 wherein the second waveguide core includes a first tapered section and a second tapered section positioned between the first terminating end and the second terminating end, and the section of the second waveguide core is positioned between the first tapered section and the second tapered section.

7. The structure of claim 6 wherein the first tapered section and the second tapered section of the second waveguide core each narrow with increasing distance from the section of the second waveguide core such that the first tapered section and the second tapered section of the second waveguide core taper in an opposite direction to the first tapered section and the second tapered section of the first waveguide core.

8. The structure of claim 6 wherein the first tapered section and the second tapered section of the second waveguide core each widen with increasing distance from the section of the second waveguide core such that the first tapered section and the second tapered section of the second waveguide core taper in a same direction as the first tapered section and the second tapered section of the first waveguide core.

9. The structure of claim 1 wherein the section of the first waveguide core has a first width, and the section of the second waveguide core has a second width that is substantially equal to the first width.

10. The structure of claim 1 wherein the section of the first waveguide core has a first width, the section of the second waveguide core has a second width, and the first width and the second width are each less than or equal to a wavelength of light being polarized divided by two times an index of refraction of the second waveguide core.

11. The structure of claim 1 wherein the third waveguide core is comprised of a metal, and further comprising:
a second dielectric layer positioned between the section of the third waveguide core and the section of the second waveguide core.

12. The structure of claim 1 further comprising:
a second dielectric layer positioned between the section of the first waveguide core and the section of the second waveguide core.

13. The structure of claim 1 wherein the section of the first waveguide core and the section of the second waveguide core are straight sections.

14. The structure of claim 13 further comprising:
a second dielectric layer positioned between the section of the first waveguide core and the section of the second waveguide core.

15. The structure of claim 1 wherein the section of the second waveguide core is arranged in a first overlapping relationship with the section of the first waveguide core, and the section of the third waveguide core is arranged in a second overlapping relationship with the section of the second waveguide core.

16. A structure for a polarizing coupler, the structure comprising:
a first waveguide core including a first straight section, a first tapered section, and a first curved section positioned along a longitudinal axis between the first tapered section and the first straight section, the first tapered section of the first waveguide core having a first terminating end; and
a second waveguide core including a second straight section, a second tapered section, and a second curved section between the second tapered section and the second straight section, the second tapered section of the second waveguide core having a second terminating end,
wherein the second curved section and the second tapered section of the second waveguide core are positioned in an overlapping relationship with the first tapered section and the first curved section of the first waveguide core.

17. A method of forming a structure for a polarizer, the method comprising:
forming a first waveguide core having a first tapered section, a second tapered section, and a section positioned along a longitudinal axis, wherein the section is arranged between the first tapered section and the second tapered section, and the first tapered section and the second tapered section each narrow in a direction along the longitudinal axis toward the section;
forming a second waveguide core including a first terminating end, a second terminating end, and a section that is arranged between the first terminating end and the second terminating end; and
forming a third waveguide core including a first terminating end, a second terminating end, and a section that is arranged between the first terminating end and the second terminating end,
wherein the section of the first waveguide core, the section of the second waveguide core, and the section of the third waveguide core are arranged relative to a dielectric layer in different layers of a layer stack, the first waveguide core is comprised of a first material, the second waveguide core is comprised of a second material different from the first material, and the third waveguide core is comprised of a third material different from the first material and the second material.

18. The method of claim 17 wherein the section of the second waveguide core is positioned in the layer stack between the section of the first waveguide core and the section of the third waveguide core.

19. The method of claim 17 wherein the section of the first waveguide core is positioned in the layer stack between the section of the second waveguide core and the section of the third waveguide core.

20. The method of claim 17 wherein the section of the first waveguide core has a first width, the section of the second waveguide core has a second width, and the first width and the second width are each less than or equal to a wavelength of light being polarized divided by two times an index of refraction of the second waveguide core.

* * * * *